United States Patent [19]

Schobbe

[11] Patent Number: 4,498,680
[45] Date of Patent: Feb. 12, 1985

[54] SEALING-RING ARRANGEMENT FOR THREADED CLOSURE BOLT

[75] Inventor: Hermann Schobbe, Fellbach, Fed. Rep. of Germany

[73] Assignee: Daimler-Benz Aktiengesellschaft, Stuttgart, Fed. Rep. of Germany

[21] Appl. No.: 586,705

[22] Filed: Mar. 6, 1984

[30] Foreign Application Priority Data

Mar. 7, 1983 [DE] Fed. Rep. of Germany ....... 3308043

[51] Int. Cl.³ .............................................. F16J 15/10
[52] U.S. Cl. ..................................... 277/112; 277/12; 277/177; 277/180; 411/369; 411/542
[58] Field of Search .................... 277/12, 32, 110–112, 277/167.5, 177, 180; 411/369, 542

[56] References Cited

U.S. PATENT DOCUMENTS

| | | | |
|---|---|---|---|
| 1,121,386 | 12/1914 | Means | 277/112 |
| 3,087,370 | 4/1963 | Iaia | 411/369 |
| 3,401,958 | 9/1968 | Demyon | 411/369 X |
| 3,430,990 | 3/1969 | Nelson | 277/112 X |

FOREIGN PATENT DOCUMENTS 1400898  5/1969  Fed. Rep. of Germany ...... 411/542

Primary Examiner—Robert S. Ward
Attorney, Agent, or Firm—Barnes & Thornburg

[57] ABSTRACT

On a screw closure for closing a high-pressure chamber of a vessel in a leak-proof manner, a sealing ring is arranged in a relief groove adjoining a threadedbore and is retained in this relief groove by a stud portion located on the screw-in side of a threaded bolt and by the bolt thread run out collar and adjacent threaded bore run out flank.

12 Claims, 2 Drawing Figures

SEALING-RING ARRANGEMENT FOR THREADED CLOSURE BOLT

BACKGROUND AND SUMMARY OF THE INVENTION

The invention relates to a sealing-ring arrangement at a threaded screw or bolt closure of an orifice in a housing wall. More specifically, the inventin relates to an improved sealing ring arrangement for a bolt closure and orifice which exhibits a relief groove in the housing wall orifice adjacent the threaded bore for the threaded bolt.

In a sealing-ring arrangement of relevant type used by the assignee of the present application for a screw closure on a high-pressure vessel, it is known to provide a sealing-off zone equipped with a fitting bore and a stop shoulder in front of the threaded bore on the pressure side. The stud of the screw bolt closing the threaded bore protrudes into the sealing off zone together with a sealing ring located in the annular groove of the stud, to ensure an accurate fit when the screw bolt is inserted, the stud at the same time resting against a stop shoulder by means of its end face.

A disadvantage is that the known sealing-ring arrangement necessitates a high outlay in terms of production costs and additional construction space for accomodating the sealing ring.

An object of the present invention is to improve the known sealing-ring arrangement so as to avoid these disadvantages.

This object is achieved by configuring the housing wall orifice and the closure bolt according to the invention such that the annular sealing ring is clampingly held in the orifice relief groove by the thread run out collar and the adjoining stud portion of the closure bolt. Preferred embodiments of the invention provide that the end of the stud portion abuts against the annular wall of the relief groove extending radially inwardly beyond the axial projection of the threaded portion of the closure bolt.

The invention ensures that there is no need for any outlay for making the fitting bore and the stud part inserted in it. Furthermore, the construction space taken up by the fitting bore is saved.

In especially preferred embodiments of the invention, the portion of the housing wall orifice adjoining the relief groove at the side opposite the threaded portion has a smaller diameter than the threaded portion, thereby forming the stop wall as a continuation of the relief groove end wall. With this arrangement, the stop abutment for the stud portion of the closure bolt and the relief groove can be made in one operation.

In especially preferred embodiments of the invention, the thread run out collar portion of the bolt and the thread run out flank of the threaded bore portion extend obliquely to one another and each extend at an angle corresponding to the thread angle and intersect one another approximately in the center of the thread depth. This arrangement provides an especially advantageous wedge shaped support for the outer end of the sealing ring.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
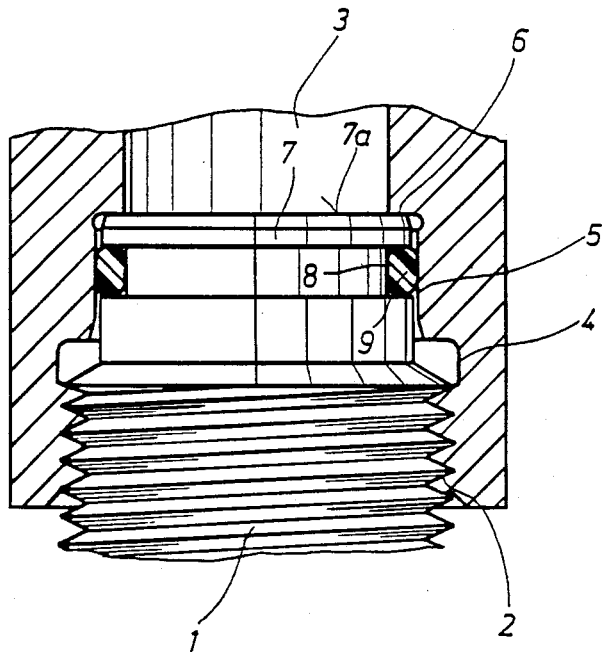
FIG. 1 is a partial longitudinal sectional schematic view showing a known sealing-ring arrangement.

The known sealing-ring arrangement illustrated in FIG. 1 consists of a threaded bolt 1 which is screwed into a threaded bore 2 of the orifice 3. The orifice 3 is connected to a high-pressure chamber.

The threaded bore 2 opens into a relief groove 4 which adjoins a fitting bore 5 with a smaller diameter than the core diameter of the threaded bolt 1 and which ends at a stop shoulder 6.

A stud 7 with an annular groove 8 and an inserted sealing ring 9 (O-ring) is located on the screw-in side of the threaded bolt 1. The stud 7, introduced into the fitting bore 5 with slight play, rests against the stop shoulder 6 by means of its end face 7a and thus forms a first sealing surface. The screw connection is further sealed off via the sealing ring 9 which is pressed against the wall of the fitting bore 5 under radial pre-stress.

Figure 2:
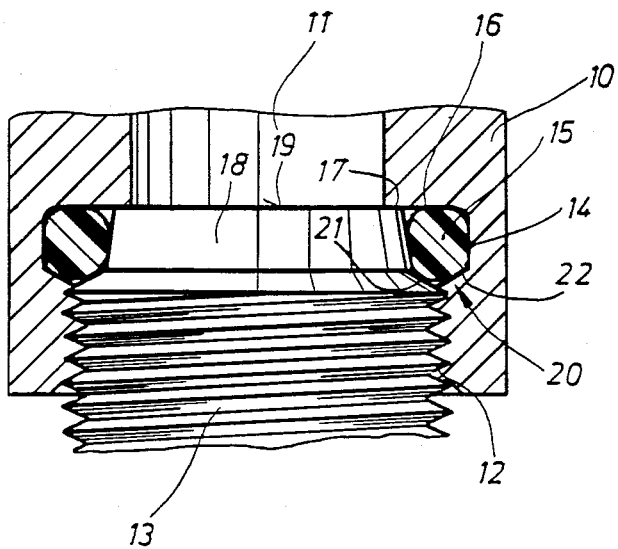
FIG. 2 is a partial longitudinal sectional schematic view showing a sealing ring arrangement constructed according to a preferred embodiment of the invention.

In the sealing-ring arrangement according to the invention, as shown in FIG. 2, the vessel wall 10 enclosing a pressure chamber has an orifice 11 with a threaded bore 12 in which a threaded bolt 13 is screwed. The theaded bore 12 ends in a relief groove 14, the dimensions of which are such that it is suitable for receiving an elastomeric sealing ring 15. The orifice 11 directly adjoining the relief groove 14 has a smaller diameter than the core diameter of the threaded bore 12.

The side flank 16 of the relief groove 14, adjacent to the orifice 11, extends at right angles to the longitudinal axis of the orifice and its annular surface projecting radially inwards in relation to the core diameter of the threaded bore 12 forms the stop shoulder 17, against which the stud 18 of the screw bolt 13 rests by means of its end face 19. The relief groove 14 is limited on the thread side by a side flank 20 which is composed of the thread run-out collar 21, located between the stud 18 and the bolt thread, and a thread run-out flank 22 of the threaded bore 12. The thread run-out flanks 21 and 22 extend obliquely in the direction of the thread and intersect approximately in the center of the thread, their angle of inclination corresponding approximately to the thread flank angle. This ensures that the thread run-outs cover one another, thus preventing damage to the sealing ring 15. To achieve the necessary radial pre-stress of the sealing ring 15 in the relief groove 14, the diameter of the stud 18 is chosen so that the sealing ring 15 is clamped between the stud surface and the groove bottom in the remaining cross-section of the relief groove 14. The stud 18 has a conical shape tapering towards the end face 19, to prevent damage to the sealing ring 15 when the bolt is screwed in.

So that damage to the sealing ring by the thread run-outs of the bolt and the nut (hole) is avoided, the two thread run-outs should intersect approximately in their center, and the angle of inclination of the run-out surfaces should correspond to the flank angle of the thread.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Sealing ring arrangement including a housing wall orifice extending through a housing wall of a high pressure vessel or the like, a threaded closure bolt for closing the orifice, and an elastomeric sealing ring interposed between the closure bolt and the housing wall to aid in sealing the housing orifice with an inserted closure bolt, wherein said housing orifice includes an outer threaded portion, an intermediate relief groove portion adjacent to and having a diameter greater than the outer threaded portion, and an inner portion adjoining the relief groove portion, wherein the threaded closure bolt includes a threaded portion, a thread run out collar portion adjoining the threaded portion, and a stud portion adjoining the thread run out collar portion, and wherein, with an inserted closure bolt, the sealing ring is clampingly abuttingly engaged by the thread run out collar portion and the stud portion, and the stud portion abuttingly engages an annular housing surface adjoining the inner end of the relief groove portion.

2. Sealing ring arrangement according to claim 1, wherein the stud portion tapers inwardly in the direction from the thread run out collar to the portion abutting the annular wall housing surface.

3. Sealing ring arrangement according to claim 1, wherein the annular wall housing surface extends perpendicular to the axis of the threaded portion of the closure and extends radially outwardly to form a substantially flat end wall surface against which the sealing ring abuts with an inserted closure bolt.

4. Sealing ring arrangement according to claim 1, wherein the stud portion exhibits a smaller diameter than the threaded portion at the end thereof engaging the annular wall housing surface.

5. Sealing ring arrangement according to claim 3, wherein the stud portion tapers inwardly in the direction from the thread run out collar to the portion abutting the annular wall housing surface.

6. Sealing ring arrangement according to claim 3, wherein the stud portion exhibits a smaller diameter than the threaded portion at the end thereof engaging the annular wall housing surface.

7. Sealing ring arrangement according to claim 1, wherein the housing wall thread flank section forming the end of the relief groove portion extends obliquely in the direction of the thread and intersects the thread run out collar portion approximately in the center of the thread with an inserted closure bolt.

8. Sealing ring arrangement according to claim 3, wherein the housing wall thread flank section forming the end of the relief groove portion extends obliquely in the direction of the thread and intersects the thread run out collar portion approximately in the center of the thread with an inserted closure bolt.

9. Sealing ring arrangement according to claim 8, wherein the stud portion tapers inwardly in the direction from the thread run out collar to the portion abutting the annular wall housing surface.

10. Sealing ring arrangement according to claim 8, wherein the stud portion exhibits a smaller diameter than the threaded portion at the end thereof engaging the annular wall housing surface.

11. Sealing ring arrangement according to claim 1, wherein the extreme free end of the stud portion abuttingly engages the annular wall housing surface with an inserted closure bolt.

12. Sealing ring arrangement according to claim 7, wherein the extreme free end of the stud portion abuttingly engages the annular wall housing surface with an inserted closure bolt.

* * * * *

UNITED STATES PATENT AND TRADEMARK OFFICE
CERTIFICATE OF CORRECTION

PATENT NO. : 4,498,680

DATED : February 12, 1985

INVENTOR(S) : Hermann Schobbe

It is certified that error appears in the above-identified patent and that said Letters Patent is hereby corrected as shown below:

Column 1, line 9 in "Background and Summary of the Invention". "inventin" is corrected to --invention--

Signed and Sealed this

Twentieth Day of August 1985

[SEAL]

Attest:

DONALD J. QUIGG

Attesting Officer     Acting Commissioner of Patents and Trademarks